United States Patent [19]

Keunecke et al.

[11] Patent Number: 5,378,827
[45] Date of Patent: Jan. 3, 1995

US005378827A

[54] PROCESS FOR THE PRODUCTION OF CELLULOSE CARBAMATE

[75] Inventors: Gerhard Keunecke, Pulheim; Adolf Arnold, Maintal; Sabine Butzke, Alzenau, all of Germany

[73] Assignee: Zimmer Aktiengesellschaft, Frankfurt, Germany

[21] Appl. No.: 122,244

[22] Filed: Sep. 16, 1993

[30] Foreign Application Priority Data

Dec. 16, 1992 [DE] Germany .................... 4242437

[51] Int. Cl.$^6$ .................................................. C08B 5/00
[52] U.S. Cl. ............................................ 536/30; 536/32; 536/38; 536/58
[58] Field of Search ............... 536/30, 32, 38, 58

[56] References Cited

U.S. PATENT DOCUMENTS 2,134,825  8/1937  Hill et al. ........................ 536/30

FOREIGN PATENT DOCUMENTS

178292B1  6/1989  European Pat. Off. .
402605A3  12/1990  European Pat. Off. .
402606A3  12/1990  European Pat. Off. .

*Primary Examiner*—Nathan M. Nutter
*Attorney, Agent, or Firm*—Allegretti & Witcoff

[57] ABSTRACT

A process for the production of cellulose carbamate from cellulose and urea through the conversion of the cellulose with excess urea in an inert liquid organic reaction carrier at a temperature in the range of 130° to 160° C., separation of the reaction carrier from the reaction mixture and washing of the reaction mixture with water. The cellulose is intimately mixed with an aqueous urea solution. Then the water in the solution is replaced with the organic reaction carrier, and the reaction of urea and cellulose is carried out in the presence of an inert gaseous carrier to remove the by-product ammonia. Thereafter, the organic reaction carrier remaining in the reaction product is replaced with an aqueous urea solution and the resulting suspension of cellulose carbamate in the urea solution is filtered and washed free of urea with water. No liquid ammonia is required in this process.

18 Claims, 1 Drawing Sheet

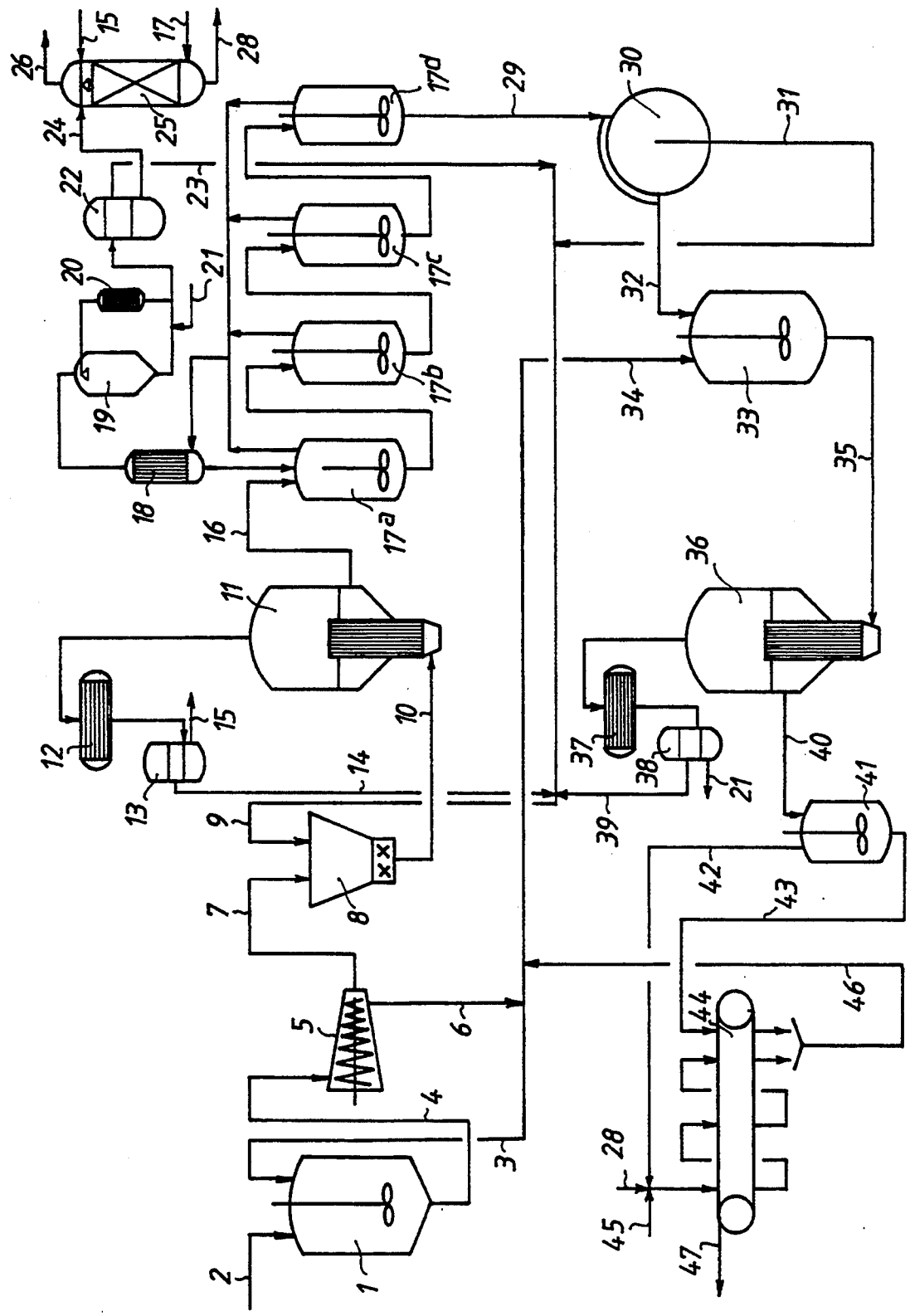

PROCESS FOR THE PRODUCTION OF CELLULOSE CARBAMATE

BACKGROUND OF THE INVENTION

The invention concerns a process for the production of cellulose carbamate from cellulose and excess urea in an inert liquid organic reaction carrier at a temperature in the range of 130° to 160° C., separation of the reaction carrier from the reaction mixture and washing of the reaction product with water.

THE PRIOR ART

It is known for the production of regenerated cellulose products to use cellulose carbamate as a soluble cellulose compound instead of cellulose xanthate, since xanthate, because of its toxicity and flammability, and in view of the more stringent environmental regulations, is problematic.

EP-B-0057 105 discloses a process for the production of cellulose carbamate in which the cellulose is impregnated with a urea solution in liquid ammonia, whereupon the ammonia is evaporated and the dry mixture of cellulose and urea is converted to cellulose carbamate at increased temperature. Since this is done with an excess of urea, the reaction product is washed finally with methanol and water to remove the excess urea. The disadvantage of this process is the low temperature required for the treatment of the cellulose with liquid ammonia containing urea, since the boiling point of ammonia is −33° C. Also, the conversion of the dry cellulose-urea mixture is very difficult to control because of its voluminous nature, and technically, due to the required residence times, reactors of quite considerable capacity would be necessary, giving rise to unacceptable investment costs. Another disadvantage is that the urea surplus after washing remains as methanol and water solutions which cannot be reused as such because to use the excess urea to impregnate the cellulose, a liquid ammonia solution is required. It is also a known practice (Lenziger Berichte, [Aug. 1985]vol. 59 p. 111) to wash the reaction product with ammonia to remove the unconverted urea. In this case also the washing stage must be carried out within the low temperature range.

EP-B-0 097 685 also discloses that cellulose can be converted to cellulose carbamate with urea at 139° C. in xylene as reaction carrier. In this case the urea is added to the xylene in granular form. Since urea is practically insoluble in xylene, even with stirring, the conversion rate is very low. The washing of the reaction product with water results in a urea solution which as such cannot be used again in this process.

THE INVENTION

The object of the invention is to provide a process for the production of cellulose carbamate from cellulose and urea that can be carried out on a large scale with acceptable investment and operational costs. In particular, the mixing of cellulose and urea, as well as the separation of the resulting cellulose carbamate from the excess urea, is performed without the aid of liquid ammonia. The conversion is carried out at a steady temperature and comparatively high speed so that the investment costs for the reactors can be minimized. Further advantages will be clear from the following description.

This object is achieved by a) mixing the cellulose with an aqueous urea solution; b) exchanging the aqueous part of the mixture for an organic reaction carrier; c) carrying out the conversion in the presence of an inert gaseous carrier generated in, or added to, the reaction zone; d) exchanging the organic reaction carrier in the reaction product for aqueous urea solution; e) separating the thus-formed cellulose carbamate from the urea solution; and f) washing it.

In order to attain a satisfactory conversion of cellulose to cellulose carbamate normally it is necessary to introduce the urea in the form of a solution in liquid ammonia. We have determined that an aqueous urea solution is adequate for this. Since the introduction of the urea into the cellulose and its separation from the cellulose carbamate according to the invention take place in the aqueous phase, a simple recycling of the excess urea is possible. It was further discovered that in spite of the impregnation of the cellulose with aqueous urea solution, such an intimate distribution of the urea in the cellulose results that the conversion takes place with satisfactory speed and uniformity even in an organic non-dissolving medium for urea. In the process according to the invention, the conversion is accelerated in comparison with the reaction without the presence of an inert liquid reaction carrier and also in comparison with the conversion in an inert liquid reaction carrier with separate addition of cellulose and urea. Since the presence of water disturbs the conversion, it is necessary to allow the conversion to take place in the organic reaction carrier and to exchange the aqueous liquid phase before and after the conversion. In both instances, the water/organic medium exchange in principle may be performed in various ways, but especially by evaporation of the liquid to be removed in the presence of and together with a part of the replacement liquid. The inert gaseous carrier passing through the reaction zone serves as a transporting agent for the removal of the ammonia formed during the conversion, whereby the conversion is likewise benefited.

In a preferred version of the invention according to step a) the cellulose is suspended in an excess of aqueous urea solution and then a portion of the urea solution is mechanically squeezed from the suspension obtained. The separation of the solution can, for example, take place up to a pressure factor of about 2 to 3, i.e., the product leaving step a) contains 2 to 3 parts urea solution to 1 part cellulose. However, the pressure factor depends on the concentration of the urea solution. At least 2.2 moles of urea per anhydroglucose unit of the cellulose must be present in the product leaving step a). In this way, a uniform distribution of the urea in the cellulose is achieved. It is advisable to form the suspension at a temperature between 25° and 60° C. The preferred temperature is about 50° C.

In general, a cellulose with a degree of polymerization (DP) in the range of 200–500, preferably 300–400, is used in this process. Since the starting cellulose frequently has a too high DP value, depolymerization is required which can be carried out using known methods. The depolymerization can be followed by comminuting the cellulose.

In a preferred version of the invention, the cellulose in step a) is mixed with a urea solution the urea concentration of which is between 20 and 60% by weight, especially 35–45% and particularly about 40%.

The exchange in step b) is preferably undertaken by adding the organic reaction carrier to the mixture from stage a) and then evaporating the water together with a portion of the reaction carrier out of the mixture. The mixture of water vapor and reaction carrier vapor leaving stage b) corresponds in its composition to the respective vapor pressures of the components. With the evaporation of the water, urea that has been dissolved is left behind in solid form in the cellulose. Step b) produces a suspension of cellulose containing finely distributed urea therein in the liquid organic reaction carrier.

Preferably the inert, liquid, organic reaction carrier is an aliphatic hydrocarbon such as a linear or branched alkane or an alkyl aromatic hydrocarbon or a mixture thereof having a boiling point between 100° and 185° C. at atmospheric pressure. Especially preferred is a mono-, di- or trialkylbenzene or a mixture thereof, with the sum of the carbon atoms of the alkyl group(s) being in the range of 1 to 4. These alkyl benzenes have boiling points in the indicated range so that operations can take place in the reaction step c) at atmospheric pressure or under pressures in the range of 0.05 to 5.0 bar. Especially favorable is toluene with a pressure in the reaction zone of about 3 bar and xylene, which can be used at atmospheric pressure. Hydroaromatics with a boiling point above 185° C., such as Tetralin or Decalin, can also be used as the inert organic reaction carrier.

In step c) the inert gaseous carrier is produced by boiling the reaction carrier, which, in the gaseous state, carries off the ammonia formed during the reaction. The gaseous carrier and the reaction carrier are chemically identical in this case. In another version of the invention, an inert gaseous carrier e.g. $N_2$, is fed into the reaction carrier from an external source. In this case the gaseous carrier and the reaction carrier are chemically different, and it is not necessary to work at the boiling point of the reaction carrier. Use can be made of relatively high-boiling liquids (above 185° C.) as the reaction carrier, such as Tetralin (1,2,3,4-tetrahydronaphthalene) or Decalin (decahydronaphthalene), which have low vapor pressures at the reaction temperature. Then the gaseous carrier is an inert gas that does not react with the reaction components, the reaction intermediate and final products or the organic reaction carrier, and is introduced into the reaction carrier which preferably is not boiling. This inert gas serves as a transport gas for the formed ammonia. Suitable inert gases as gaseous carrier are, e.g., nitrogen, argon and gaseous hydrocarbons, such as methane, ethane, propane or mixtures thereof. The molar ratio of inert gas to the formed ammonia is in the range of 1:1 to 5:1.

According to the preferred version of the invention process, the conversion in step c) is carried out at a temperature between 135° and 150° C.

It is advisable to carry out the exchange in step d) by d-1) separating a first portion of the organic reaction carrier from the reaction mixture mechanically, d-2) mixing the remaining reaction product with aqueous urea solution and d-3) then evaporating the remainder of the reaction carrier together with a portion of the water in the aqueous urea solution. Although the exchange can take place otherwise, e.g., through extraction, nevertheless it is preferred to do it analogously to the liquid exchange in step b) by evaporating a mixture of water and of the reaction carrier. To save energy the greater part of the reaction carrier is mechanically separated in step d-1), e.g., on a filter, and only the portion of the reaction carrier clinging to the cellulose carbamate urea mixture is driven off by distillation in step d-3). Preferably, in step d-2) the aqueous urea solution is added in such an amount that the weight ratio of the total liquid phase to the solid cellulose carbamate in the remaining reaction product is in the range of 20 to 40.

After the exchange of the organic reaction carrier with urea solution, the cellulose carbamate separated in step e) from the urea solution, is subjected in step f) preferably to a continuous counter-current washing. The cellulose carbamate contains solid urea and possibly biuret, which are undesirable in the end product. These water-soluble contaminants of the product are removed by the washing.

It is desirable to concentrate the suspension resulting from step d-3) by means of flash evaporation, to a urea concentration that is higher than the concentration of the urea solution used in step a). For this flash evaporation, the heat of the mixture resulting from the distillation step d-3) is utilized. At the same time, water condensate is recovered from the circuit of the urea solution, which can be used in the washing step f). The product can therefore be washed intensively without diluting the recycled urea solution to an undesirable degree.

It is advisable to combine the urea solution resulting from the separation in step e) with wash water resulting from step f) and using again the combined solution in stages a) and d). From the circuit of the urea solution water is given off essentially only in one place, namely as water vapor together with ammonia formed in the reaction step c). The ammonia removed from step c) is first absorbed by washing with water, which is preferably derived from the condensed vapors of distillation step d-3), and then is stripped off out of the wash solution. This water vapor ammonia mixture, which can also contain some vapor of the inert reaction carrier, is discharged, for example, to a waste-gas incinerator. In the urea cycle supplementary water may be added to the wash in step f), while supplementary urea is at least added to the urea solution entering into step a).

The inert organic reaction carrier is advantageously recycled through the steps b), c) and d). The dissolved reaction by-products and the dissolved impurities of the cellulose can be separated out of the reaction carrier, e.g., by diverting and distilling at least a part of the stream of the reaction carrier and recycling the distillate.

The cellulose carbamate recovered from washing step f) can be processed without further purification into a solution for the production of regenerated cellulose products, like films, fibers or other shaped articles.

THE DRAWING

One version of the process according to the invention is described in more detail below with the aid of the flow diagram shown in the drawing, which shows a plant for the production of cellulose carbamate. In the flow diagram, for the sake of simplicity, secondary set-up parts, such as pumps, tanks and heat exchangers, are omitted, as will be obvious to the specialist.

DETAILED DESCRIPTION OF THE PREFERRED EMBODIMENT

A stirring vessel 1 is charged continuously via line 2 with chopped-up cellulose with a DP of 350. Several vessels in series may be used to increase capacity. The vessel is fed via conduit 3 with an aqueous urea solution having a urea concentration of 40% by weight and a temperature of 50° C. The thus-formed suspension is fed via conduit 4 into a screw extruder 5, in which the excess urea solution is pressed off and recycled to vessel 1, via conduits 6 and 3. The pressing out of the urea solution takes place, e.g., up to a pressure factor of 3, i.e., the cake exiting from the extruder 5 contains 1 part cellulose and 3 parts urea solution. This mixture is fed through conduit 7 into a disintegrating and loosening apparatus 8, into which prewarmed liquid reaction carrier is also fed through conduit 9.

The mixture of cellulose, urea solution and reaction carrier leaving apparatus 8 is pumped through conduit 10 into an evaporator 11. In the evaporator 11, operated under atmospheric pressure, the entire water portion of the mixture and a portion of the organic reaction carrier are evaporated overhead. The vapor mixture is condensed in the condenser 12 and flows into the separator vessel 13. The organic reaction carrier returns through conduit 14 to the reaction carrier cycle; the water is led through conduit 15 to a stripper 25, which is described in further detail below.

From the evaporator 11 the suspension consisting of cellulose and urea in the reaction carrier is drawn off through conduit 16 and, in a heat exchanger (not represented) located in the conduit, heated up to the reaction temperature. The suspension then flows in a cascade through four successive stirring reactors 17a–17d, in which the reaction mixture remains for several hours for conversion. In the illustrated form conversion takes place in the reactors with boiling reaction carrier, i.e., the pressure and temperature conditions are such that the reaction carrier boils. Through the vapors of the boiling reaction carrier, ammonia, which is a by-product in the formation of cellulose carbamate, is removed from the reaction mixture. The vapors streaming out of the reactors 17a–17d are led together into the condenser 18. The preponderant portion of the reaction carrier vapor is condensed there and flows back to the first reactor 17a; the vapors passing through the condenser, which consists essentially of ammonia, entrained urea and reaction carrier, are washed in a washer 19 with a recirculated aqueous solution cooled in cooler 20; water is supplied through conduit 21 from a later place in the process, as will be described below. The wash liquid drawn from the washer 19 is separated in a separator vessel 22. The organic reaction carrier is led directly into the process through conduits 23 and 9; the aqueous phase charged with ammonia and urea is led through conduit 24 into an ammonia stripper 25, in which water vapor, ammonia and residual vapors of the reaction carrier vapor are stripped off by means of water and water vapor flowing through lines 15 and 17, respectively, and drawn off through conduit 26 and, e.g., burned. A weak aqueous urea solution flows from the sump of the stripper 25 through conduit 28 and is used in the washing of the end product, as described below.

The reaction mixture is drawn off from the last stirring vessel 17d through conduit 29, cooled in a heat exchanger (not shown) and is then sent to a pressure filter drum 30, on which the reaction carrier is pressed through the Filter and returned through conduit 31 to the reaction carrier cycle. Solids consisting of cellulose carbamate, excess urea and adhering reaction carrier are removed from the filter and transferred via conduit 32 to a mix tank 33, in which the cake is suspended with urea solution supplied through conduit 34. The suspension goes to a second evaporator 36 through conduit 35. There a mixture of the reaction carrier vapor and water vapor is drawn off overhead until the entire reaction carrier is removed from the mixture. The drawn-off vapor mixture is condensed in a condenser 37; the condensate is collected in the separating vessel 38. The reaction carrier phase returns through conduit 39 to the reaction carrier in conduit 9. The aqueous condensate is led through conduit 21 as a wash liquid to the washer 19.

Cellulose carbamate and urea solution flows from evaporator 36 through conduit 40 to a flash evaporator 41, in which the mixture is flash cooled due to expansion. Water evaporates simultaneously. The water vapor is drawn off through conduit 42, condensed in a condenser (not represented) and used in the washing of the reaction product. The cooled suspension is pumped out of the flash evaporator 41 through conduit 43 to the band filter 44. On the band filter the cellulose carbamate is first separated from the urea solution; then the carbamate passes on the filter band through the wash zone, in which it is washed free of urea in a counter current flow of water. Water is supplied through conduits 28 and 42. Fresh water may be added through conduit 45. The wash water and urea solution separated from the product are combined and returned via conduit 46 to the urea solution cycle. The damp urea-free cellulose carbamate leaves the plant at 47 and is either subjected to drying (not shown) or immediately dissolved for further processing.

EXAMPLE 1

In a plant corresponding to the flow diagram 3.1 kg/h of cellulose with 7% water and a DP of 350 is suspended with an aqueous solution containing 40% urea at 50° C. and then pressed to a pressure factor of 3. The mixture of cellulose, urea and water is, with disintegration, mixed with 71.9 kg/h of toluene having a temperature of 105° C. and then subjected to evaporation in an evaporator under atmospheric pressure at 85° C. Overhead are drawn off 27.9 kg/h of a vapor mixture consisting of 12.6% by weight water vapor and 87.4% by weight toluene, which is condensed. 52.7 kg/h of a mixture of cellulose, urea and toluene leave the evaporator at about 85° C. This mixture is then heated to 145° C. and converted in several successive stirring vessels under 3 bar pressure, the residence time totalling 4.5 hours. In the presence of boiling toluene the ammonia formed is entrained by the toluene vapors and quickly led off from the reactors. The product is then cooled to 90° C. and filtered. There result 10.4 kg/h of filter cake comprising 30% cellulose carbamate, 20% urea and 50% toluene. The filter cake is suspended in 96.7 kg/h aqueous urea solution at 85° C. The suspension is then evaporated down to completely remove the toluene. The 5.9 kg/h vapor mixture rising from the evaporator consists of 87.4% by weight of toluene and the rest water vapor. 101.1 kg/h of a suspension of cellulose carbamate in urea solution from the evaporator, is flash cooled from 85° C. to 50° C. At the same time the urea concentration of the aqueous phase rises from 40% by weight to about 45% by weight. This suspension is then filtered and washed with water. The result is about 9.3 kg/h of cellulose carbamate with a moisture content of about 11%.

EXAMPLE 2

The process of Example 1 was repeated with the following changes:

Cellulose that had been reduced to DP 350 was mixed with 40% urea solution. Excess solution was pressed off to a pressure factor of 2.67. The obtained wet mixture was mixed with technical xylene and heated for an hour to about 95° C. at atmospheric pressure, whereby the total amount of water and about 6% by weight of the xylene distilled off. Thereafter, the mixture was heated for 4.5 hours to 145° C., and the xylene which distilled off condensed and returned to the mixture. During the last half hour the development of ammonia was no longer observable. The product was separated from the xylene and washed with water. A cellulose carbamate with a substitution degree of 0.24 was obtained.

EXAMPLE 3

Cellulose with a DP of 350 was processed in the same way as described in Example 2, however, technical Decalin was used instead of xylene.

All the water and approximately 5 wt. % of the Decalin were distilled off at 100° C. and atmospheric pressure. The reaction conditions were also 4.5 h and 145° C., but at a pressure of approximately 0.75 bar.

However, at 145° C., the vapor pressure of Decal in was only approximately 0.33 bar. Therefore, to remove the ammonia formed during the reaction, a stream of nitrogen was passed through the reaction product with a molar ration of $N_2$ to $NH_3$ of approximately 3. The resulting cellulose carbamate had a degree of substitution of 0.23.

We claim:

1. A process for producing cellulose carbamate from cellulose and excess urea in an inert liquid organic reaction carrier which comprises
    a) mixing the cellulose with an aqueous urea solution,
    b) exchanging the water portion of said solution for said liquid organic reaction carrier,
    c) converting said cellulose mixture to cellulose carbamate with the formation of by-product ammonia at a temperature in the range of 130° to 160° C. and a pressure in the range of 0.05 to 5 bar, while removing said ammonia by an inert gaseous carrier from the reaction product, said reaction product comprising cellulose carbamate, urea and organic reaction carrier,
    d) exchanging said organic reaction carrier in the reaction product for aqueous urea solution,
    e) separating the cellulose carbamate from the urea solution, and
    f) washing the separated cellulose carbamate.

2. The process of claim 1 in which step a) includes suspending said cellulose in an excess of said aqueous urea solution and removing a portion of said solution from the cellulose before proceeding to step b).

3. The process of claim 1 in which in step a) said mixture has a temperature of between 25° and 60° C.

4. The process of claim 1 in which said cellulose has a DP of 200 to 500.

5. The process of claim 1 in which said urea solution in step a) has a urea concentration of between 20 and 60% by weight.

6. The process of claim 1 in which the exchange in step b) comprises adding said organic reaction carrier to the mixture from step a) and evaporating said water portion and a portion of said reaction carrier from the mixture.

7. The process of claim 1 in which said liquid organic carrier is taken from the group consisting of linear or branched alkanes, alkyl aromatic hydrocarbons or mixtures thereof having a boiling point of 100° to 185° C. at atmospheric pressure and of 1,2,3,4-tetrahydronaphthalene or decahydronaphthalene having a boiling point above 185° C.

8. The process of claim 1 in which said liquid organic carrier is an alkyl benzene, the alkyl groups having a total of from 1 to 4 carbon atoms.

9. The process of claim 1 in which the temperature in step c) is equal to the boiling temperature of said organic reaction carrier at said pressure and said gaseous carrier is a portion of the volatilized organic reaction carrier.

10. The process of claim 1 in which the temperature in step c) is lower than the boiling temperature of said organic reaction carrier at said pressure and said gaseous carrier is an inert gas introduced in said reaction product.

11. The process of claim 1 in which the exchange in step d) is carried out by
    d-1) mechanically separating a first portion of said organic reaction carrier from said reaction product,
    d-2) mixing the remaining reaction product with aqueous urea solution, and
    d-3) evaporating the remainder of the reaction carrier together with a portion of the water in said solution.

12. The process of claim 11 in which step d-2) said aqueous urea solution is added in such an amount that the weight ratio of the total liquid phase to the solid cellulose carbamate in said remaining reaction product is in the range of 20 to 40.

13. The process of claim 1 in which washing step f) comprises flowing water counter current to the flow of cellulose carbamate.

14. The process of claim 11 which includes increasing the urea concentration of the aqueous solution leaving step d) by flash evaporation of the water.

15. The process of claim 14 in which the evaporated water is condensed and recycled to step f).

16. The process of claim 1 in which the urea solution separated from the cellulose carbamate in step e) is combined with the wash water of step f) and the combined solution is recycled for use as the urea solution in steps a) and d).

17. The process of claim 1 or 6 in which all of the organic reaction carrier separated in the process is recycled to step b).

18. The process of claim 17 in which the organic reaction carrier is separated from dissolved impurities from the cellulose and by-products of the reaction before being recycled.

* * * * *